United States Patent [19]

Farrelly

[11] 4,003,782

[45] Jan. 18, 1977

[54] APPARATUS FOR PRODUCING A PACKAGE OF IMBRICATED BAGS

[75] Inventor: Walter M. Farrelly, Wilmington, Del.

[73] Assignee: Vac-Pac Manufacturing Co., Baltimore, Md.

[22] Filed: May 30, 1975

[21] Appl. No.: 582,099

[52] U.S. Cl. .............................. 156/552; 156/560; 156/566; 156/578

[51] Int. Cl.[2] .................... B32B 31/10; B65D 73/00

[58] Field of Search .......... 156/385, 391, 519, 547, 156/548, 552, 555, 556, 560, 566, 578, 362, 265; 206/460, 801, 813; 53/385, 384, 187; 229/69

[56] References Cited

UNITED STATES PATENTS

| | | | |
|---|---|---|---|
| 2,467,565 | 4/1949 | Owens et al. | 156/519 |
| 2,715,934 | 8/1955 | Sabee et al. | 156/555 |
| 3,264,161 | 8/1966 | Stremke, Jr. | 156/566 |
| 3,269,643 | 8/1966 | McDowell | 156/548 |
| 3,331,182 | 7/1967 | Hannon | 53/385 |
| 3,565,728 | 2/1971 | Alton | 156/519 X |
| 3,583,889 | 6/1971 | Califano et al. | 156/555 X |
| 3,587,843 | 6/1971 | Wing | 229/69 X |
| 3,587,844 | 6/1971 | Wing | 229/69 X |
| 3,738,905 | 6/1973 | Thomas | 156/547 X |
| 3,751,324 | 8/1973 | Enskat | 156/560 X |
| 3,856,604 | 12/1974 | Lukkarinen | 156/519 X |

*Primary Examiner*—Douglas J. Drummond
*Assistant Examiner*—M. G. Wityshyn
*Attorney, Agent, or Firm*—Gerald J. Ferguson, Jr.; Joseph J. Baker

[57] ABSTRACT

An apparatus is disclosed for receiving bags from a source thereof and applying them, in an imbricated manner, to two lines of pressure sensitive adhesive coated tape. The source normally being a bag making machine of the intermittant type wherein the delivery motion is provided by a crank arm providing, during 180° of its cycle, a feeding or drive motion and during the remaining 180° of its cycle, a dwell time. The apparatus in general comprises a transport system carried by a frame which system is driven in periodic synchronization with such a machine supplying the bags. An individual bag is transported from the source to a taping mechanism located at the end of the system. The taping mechanism secures the individual bags to the tapes during the dwell period of movement of the transport system to form a package. The package of imbricated bags can be festooned in a carton or wound on a roll. The taping mechanism can also be pivoted such that the individual bags clear the mechanism and are stacked unattached to the tapes. If the bags are of the type wherein both ends are closed, a mechanism is also provided for applying a spot of glue adjacent one end of each bag to facilitate its opening for subsequent use.

23 Claims, 19 Drawing Figures

FIG. 5a
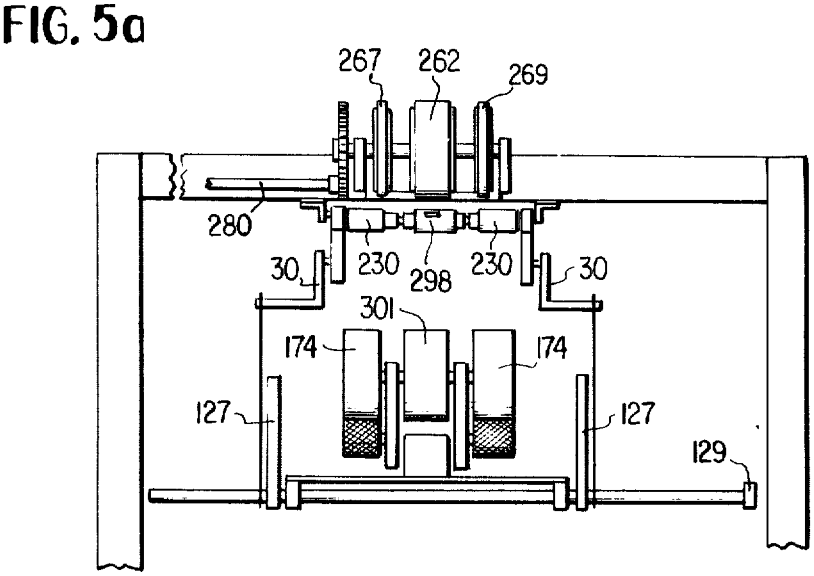
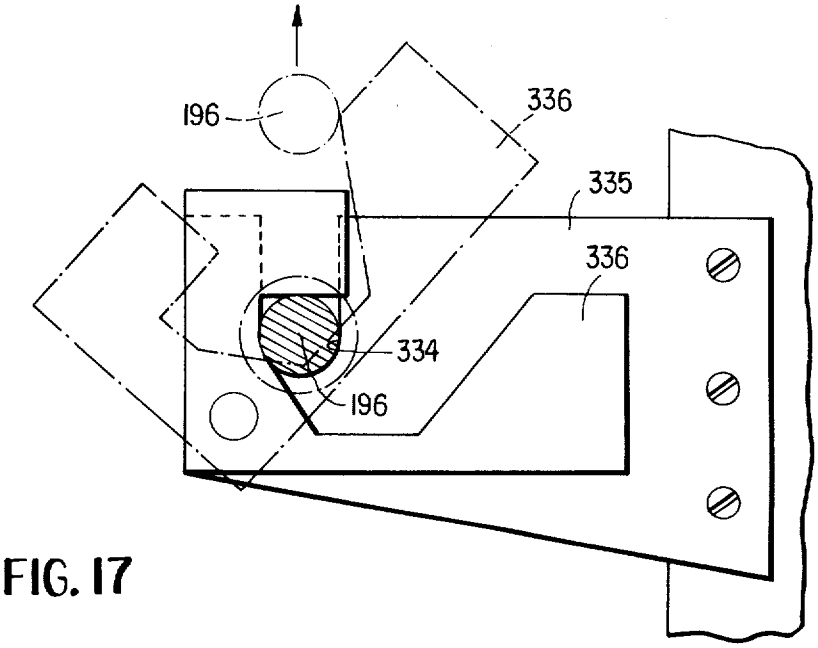
FIG. 17
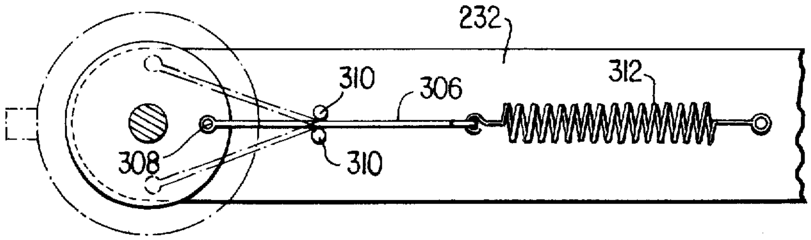
FIG. 16

FIG. 7
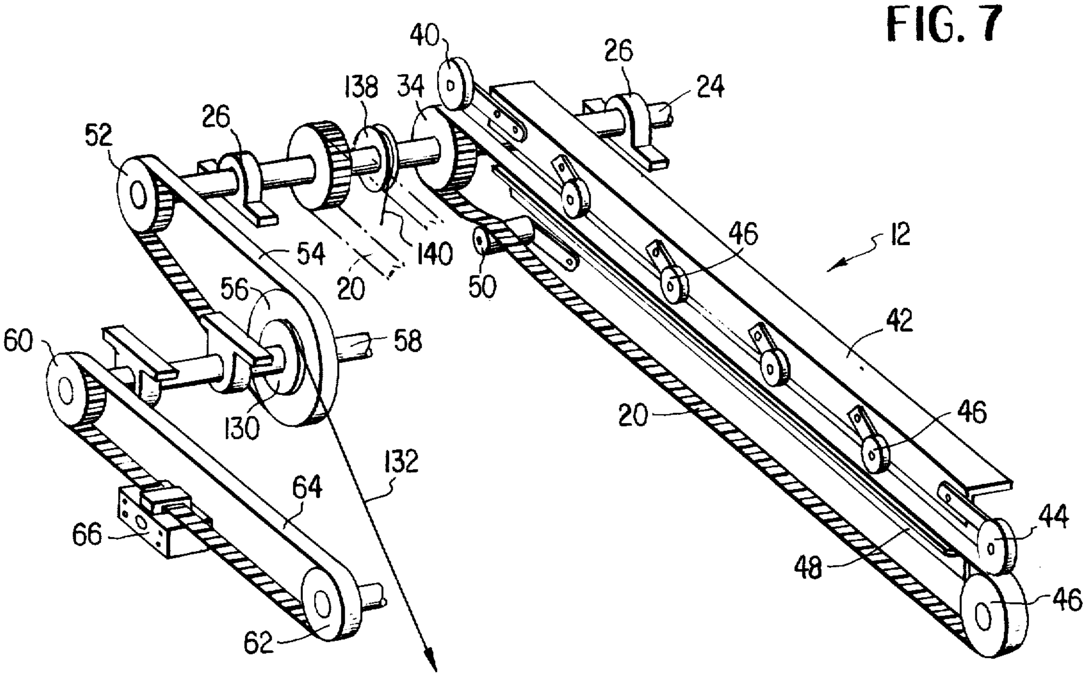
FIG. 14
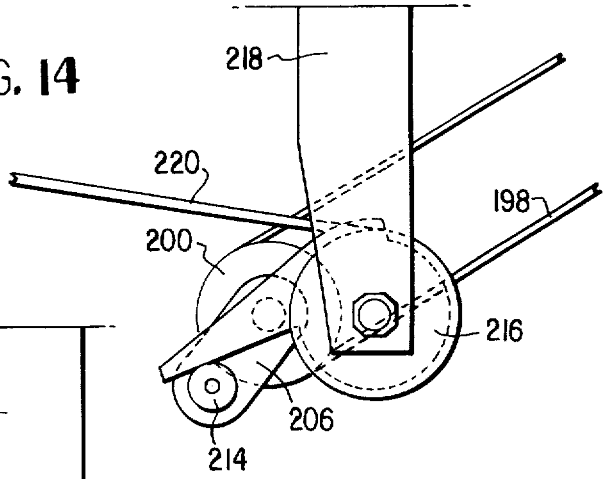
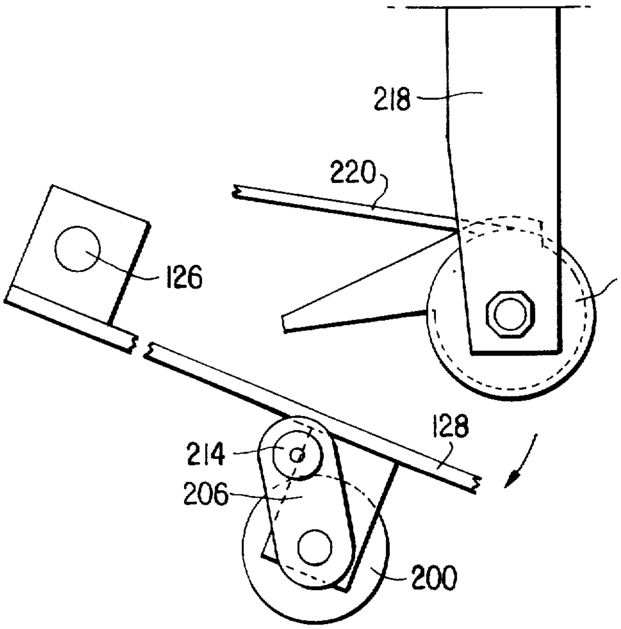
FIG. 15

APPARATUS FOR PRODUCING A PACKAGE OF IMBRICATED BAGS

BACKGROUND OF THE INVENTION

The present apparatus has for its purpose to produce, in an efficient and economical manner, a continuous chain of equally spaced, imbricated plastic-like open or closed ended bags each connected to two strips of parallel, adhesive coated tapes. An example of the general type of open ended bag is disclosed in U.S. Pat. No. 3,686,823 issued Aug. 29, 1972 and the general type of close ended bag is disclosed in my copending U.S. patent application Ser. No. 512,853 filed Oct. 7, 1974, now U.S. Pat. No. 3,915,302. The chain of inbricated bags is normally fed to a packaging machine of the general type disclosed in my copending U.S. patent application U.S. Ser. No. 512,854 filed Oct. 7, 1974, now U.S. Pat. No. 3,908,343. If the bag is of the close ended type, a spot of glue can be placed between the bags adjacent the closed end by the present apparatus such that the removal of a bag from the adhesive tapes automatically opens one end of the next successive close ended bag. The bags are generally made of a plastic-like material such as polypropylene, polyethylene or polyester.

SUMMARY OF THE INVENTION

The apparatus of the present invention comprises a frame having mounted thereon a transport system in the form of two spaced-apart, continuous, transport belts which serve as a conveyor for transporting a single bag as it emerges from an adjacent machine producing the bag to a fixed taping position located at the end of the transport system in the direction of movement of the bags. A main drive shaft is connected at one end to the bag producing machine and at the other end to the transport belts via a mechanical linkage which includes a bell crank and pitman arm to insure that the transport belts move at the same relative speed as the bag emerging from the bag producing machine. A taping mechanism is mounted on the frame at the taping position and comprises two rubber covered taping rolls around which tapes are fed having their adhesive side up. The taping rolls are rotatably mounted on a platform which is capable of pivoting relative to the frame. The taping rolls are rotated by means of a suitable linkage to a cam actuated lever associated with the main drive shaft. Two presser rolls are pivotably mounted on the frame directly above the rubber, tape carrying, taping rolls. The presser rolls are also moved into and out of engagement with the taping rolls by means of a suitable linkage to another cam actuated lever associated with the main drive shaft.

The presser rolls are moved to their upper position out of the way while the bag is being fed into taping position by the transport belts. As soon as the top of the bag is stopped at the taping position, the presser rolls are caused to descend, thereby pressing the bag onto the adhesive tapes. While the presser rolls hold the bag in contact with the tapes, the taping rolls are caused to rotate a short distance to thereby move the top of the bag off of the continuous belt. The resulting imbricated chain of bags can then be wound on a pickup roll or can be festooned in a carton. If it is desired to stack the bags on top of each other unattached to tapes, the taping platform and associated presser rolls can be pivoted to an inoperative position.

Whenever the bags are of the type which are closed at both ends, the adjacent bags are glued together at a spot to thereby facilitate opening of a bag as the preceding bag is filled and removed from the adhesive tapes.

To print a spot of glue on each bag as it is being secured to the adhesive tape, an additional rubber covered roll is mounted centrally of the taping rolls. A print roll is also mounted centrally of the presser rolls on the same shaft as the presser rolls. A glue pot with suitable transfer rolls is mounted above the presser rolls. The print roll contacts the last transfer roll of the glue pot whenever the presser rolls are in their upper position and deposits or prints the glue in the form of a spot on the bag when the presser rolls are in their down position as the bag is advanced by the taping rolls.

It is a primary object of the present invention to provide an efficient and economic apparatus for securing bags to adhesive coated tapes to form a continuous, equally spaced, imbricated chain thereof which can be wound in a roll or festooned in a carton.

It is another object of the present invention to provide an apparatus which can tape together, in imbricated fashion, a chain of bags wherein each bag in the chain has the same width and length or wherein the widths and lengths of the bags in the same chain vary.

It is still another object of the present invention to provide an apparatus which can, in addition to its aforementioned taping function, provide a spot of glue adjacent one end of each bag to facilitate the opening of each bag as the preceding bag in the chain is removed from the adhesive coated tape.

It is yet another object of the present invention to provide an apparatus which can transport a bag from a machine producing said bag to a location where a plurality of said bags are desired to be stacked unattached to the adhesive coated tape or to each other.

Other objects, features and advantages of the invention will become apparent from the following detailed description taken in connection with the accompanying drawings.

BRIEF DESCRIPTION OF THE DRAWINGS

FIG. 5*a* is the same elevational end view as shown in FIG. 5 with the taping platform in its inoperative position;

FIG. 7 is a view in perspective of the bag transport mechanism;

FIG. 14 is a side elevational view of a portion of the drive mechanism for the taping rollers in its actuated state;

FIG. 15 is a side elevational view of a portion of the drive mechanism for the taping rollers when the taping platform is lowered to its inoperative position;

FIG. 16 is a side view in partial phantom of the glue print roller return mechanism taken along the lines B—B of FIG. 11; and FIG. 17 is a side view of the windup spool locking mechanism taken along lines C—C of FIG. 5.

DETAILED DESCRIPTION OF THE PREFERRED EMBODIMENT

Figure 1:
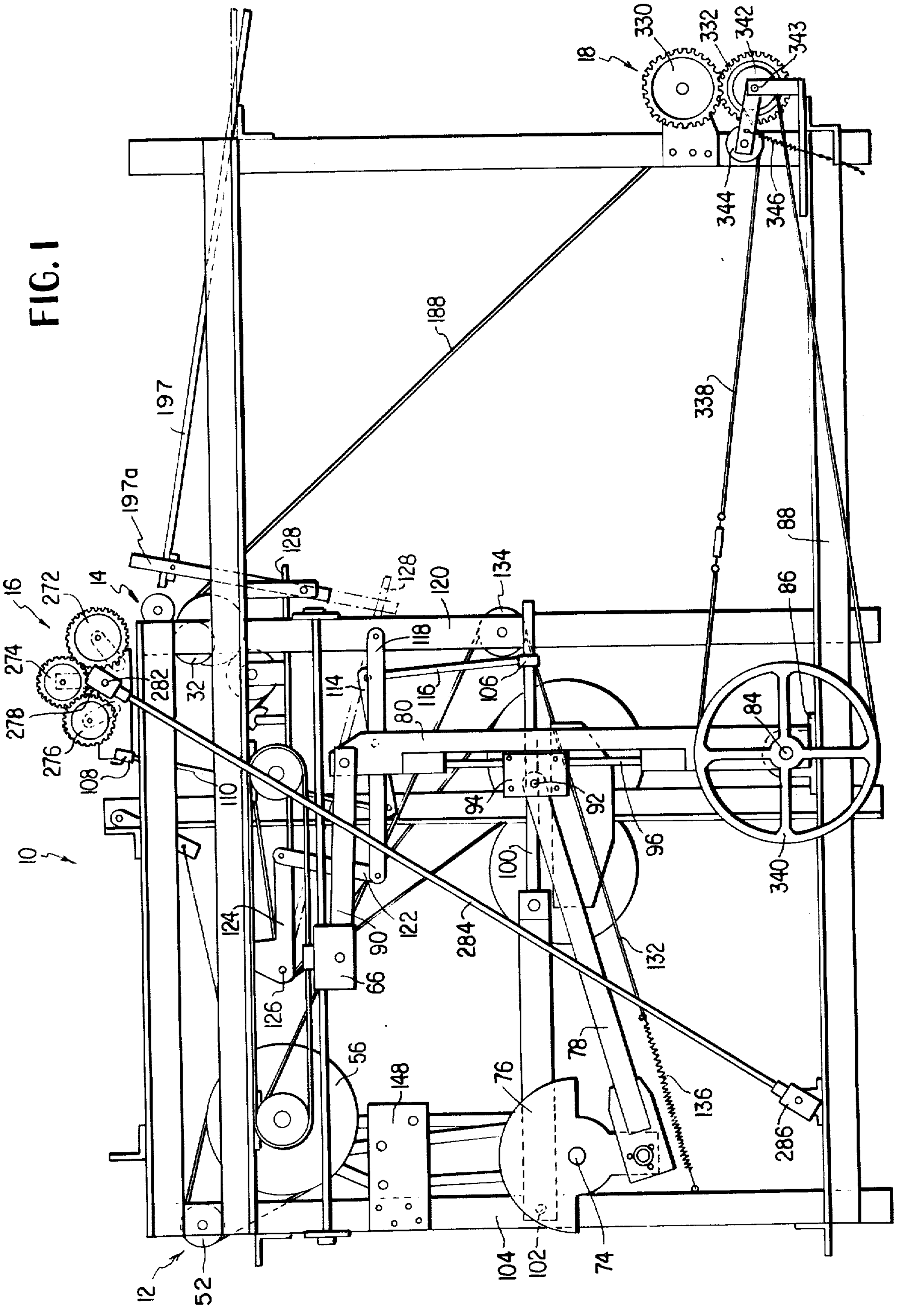
FIG. 1 is a side view in elevation of the apparatus of the present invention for producing a package of imbricated bags and showing the drive mechanism.
Figure 2:
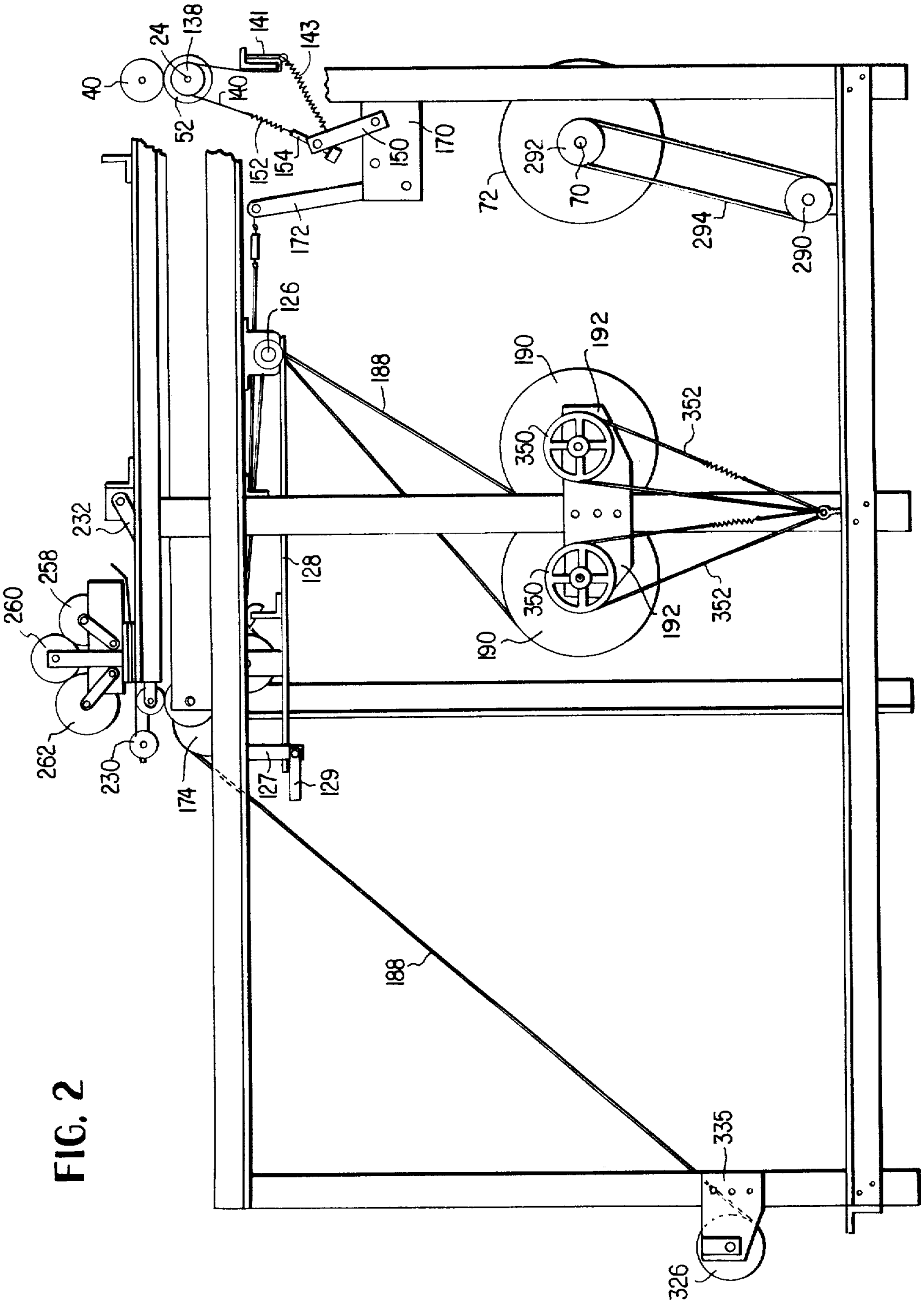
FIG. 2 is another side view in elevation of the apparatus showing the tape supply rolls.
Figure 3:
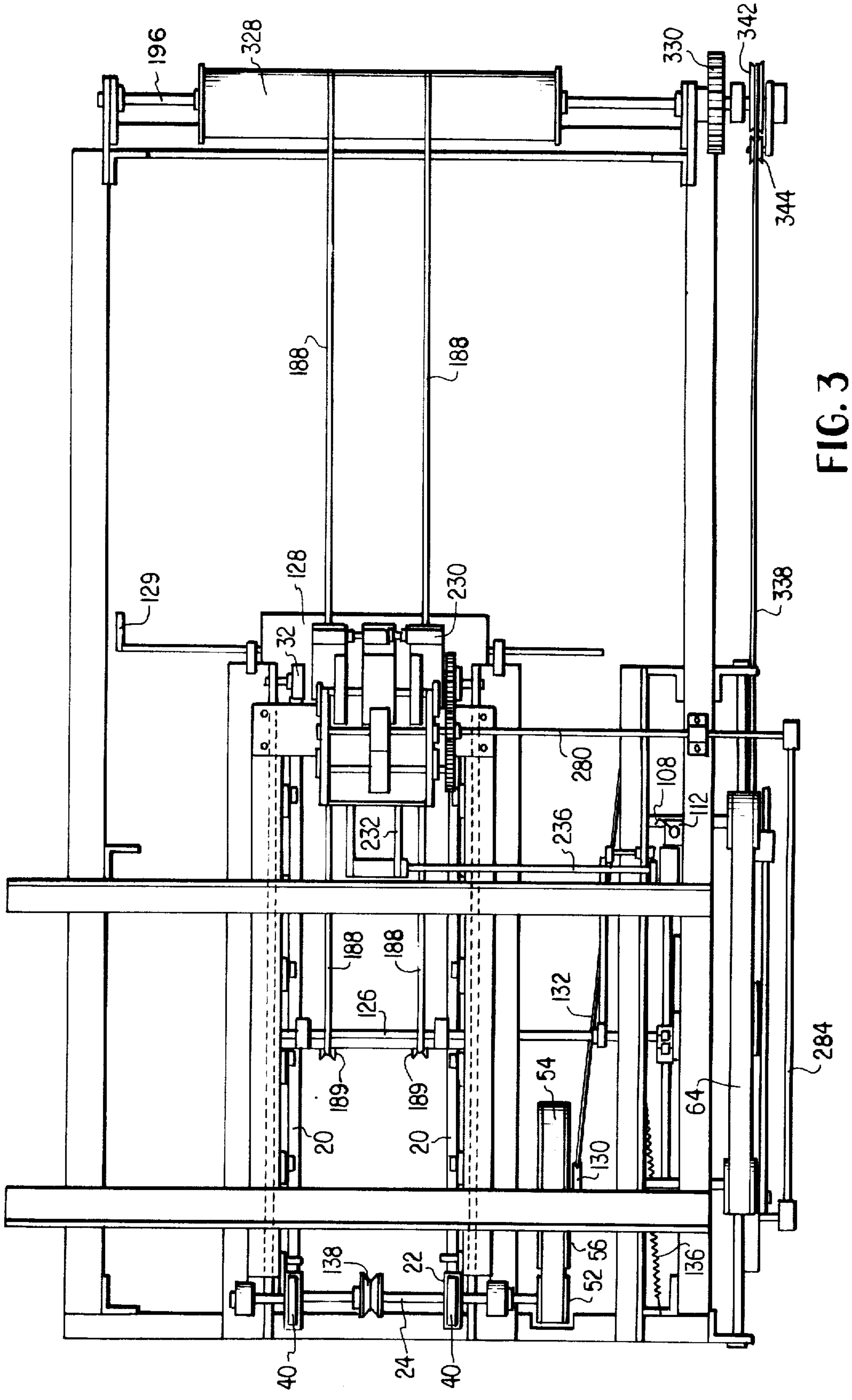
FIG. 3 is a plan view of the apparatus
Figure 5:
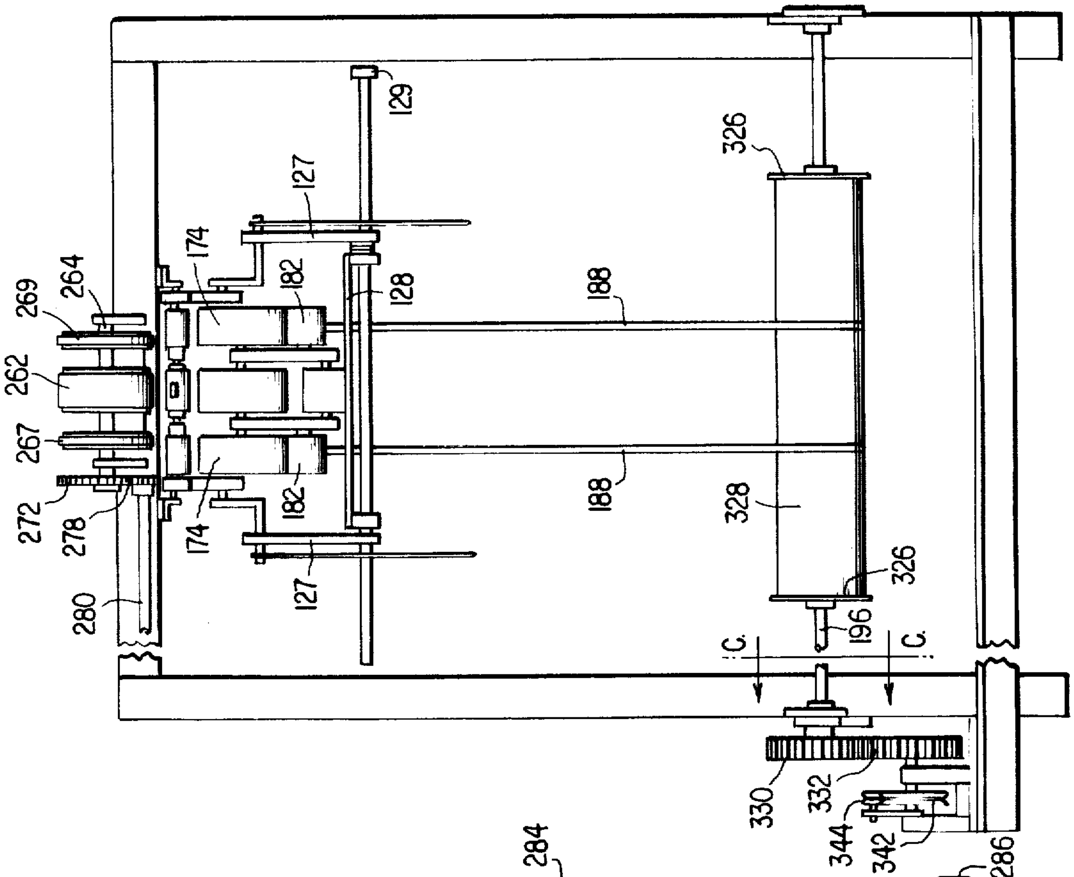
FIG. 5 is another end view in elevation of the apparatus showing the taping platform in its position for taping.
Figure 4:
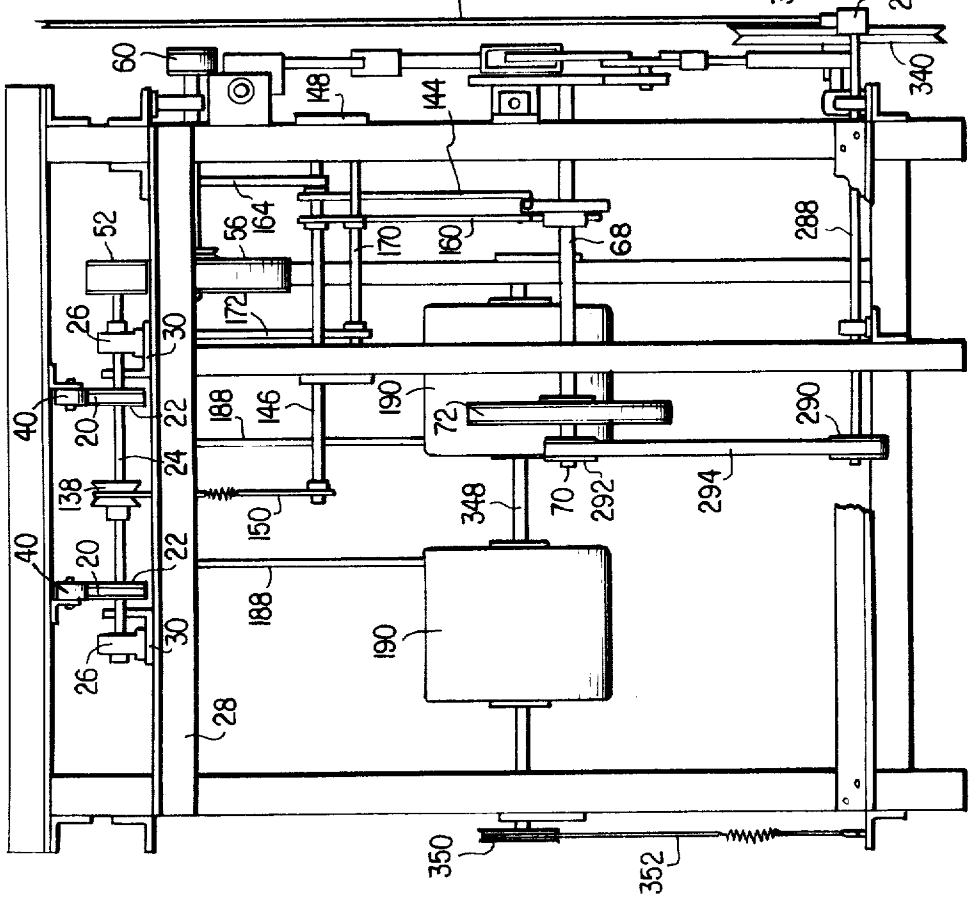
FIG. 4 is an end view in elevation of the apparatus again showing the drive mechanism.

Referring now to the drawings where like characters of reference indicate the same elements in each of the several views, FIGS. 1–8 show generally at 10 the apparatus of the present invention for producing a package of imbricated bags either wound on a roll, festooned in a carton or stacked singly in a tray.

The apparatus 10 comprises generally a transport system 12 and drive mechanism therefor for transporting a bag from a bag producing machine to a taping position, a taping mechanism 14 and drive means therefor at the taping position for securing the bag to one or more adhesive coated tapes, a gluing mechanism 16 and drive means therefor adjacent the taping mechanism 14 for placing a spot of glue on each bag to secure adjacent bags together if the bags are of the close ended type, and a windup mechanism 18 and drive means therefor for winding the imbricated bags in a roll.

The transport system 12 comprises a pair of spaced apart, parallel belts 20 of the so called timing or gear type. The belts 20 are positioned at one end on pulleys 22 which are secured to a drive shaft 24 journalled in bearings 26. The bearings 26 are in turn mounted on transverse frame member 28 and longitudinal frame members 30. The other end of the belts 20 are positioned on idle pulleys 32 mounted for rotation on longitudinal frame member 30. The top 34 of the gear belts 20 must be the same height from the floor as the line of bags emerging from between feed rollers 36, 38 of the bag producing machine, the remainder of the bag producing machine is not shown. The pulleys 22 and feed rollers 36, 38 must be mounted as close as possible to each other so as to insure easy transfer of the single bags 39 from one machine to the other. The bag 39 coming from the bag producing machine usually has a closed front portion 39*a* the edge of which may be straight or cut in a convex shape and the open trailing portion 39*b* may be straight or cut in a concave shape. For purposes of illustration and description herein, the bag 39 will be of the type having a convex, closed front end portion and a concave, open trailing end portion. It being understood of course that the machine herein described will function equally well with bags having either straight or arc cut end portions. The convex shaped front portion 39*a* enters between the top 34 of the belts 20 and a pair of large, spaced apart idle rollers 40 mounted directly above pulleys 22 on longitudinal frame members 42. A similar set of spaced apart idle rollers 44 are located above idle pulleys 32 at the other end of the transport system 12. A plurality of smaller idle rollers 46 are mounted on frame members 42 above each belt 20 and rotate as the belts 20 do. The rollers 40, 44 and 46 exert a slight pressure on the bag as it is received from the bag producing machine. This pressure is slight enough to allow slippage between the bag and belt surface 34 until the bag is entirely released from the bag machine at which time it is carried along at the same speed as the belt surface 34. A channel member 48 is mounted below the top portion of the belts 20 to prevent the belts from sagging. To insure proper tension on the belts 20, an additional idler roller 50 is provided which is biased against the outer surface of the lower portion of the belts 20.

In order to move a bag 39 and in particular its convex shaped front portion 39*a* from its position in the bag making machine to a position wherein its concave shaped trailing end portion 39*b* is beneath roller 44 in one one-half cycle of the machine, a drive pulley or pinion 52 secured to shaft 24 which is connected by a chain-type belt 54 to a larger drive pulley 56. The drive pulley 56 is in turn connected by shaft 58 to the first of two spaced apart pulleys 60. The first pulley 60 is keyed to shaft 58 and is a drive pulley, the second pulley 62 is an idler pulley. Another chain type belt 64 connects the pulleys 60, 62 to, in effect, form the equivalent of a rack. A connection member 66 is secured to the lower portion of belt 64 such that movement of the connection member 66 between pulleys 60, 62 will impart a rapid rotational movement to transport belts 20.

The distance the transport belts 20 move is independent of the length of bag 39. This is because all bags 39 are restrained from moving except as allowed by movement of the bag producing machine feed roller 36, 38 until after the trailing end portion 39*b* emerges from the feed rollers 36, 38 whereupon it is transported freely by the rotational movement of the transport belts 20 to a position directly beneath idle rollers 44 for each horizontal movement of the connection member 66 from right to left as viewed in FIG. 1. The time at which a bag 39 is fully released from the bag producing machine feed rollers 36, 38 depends, in cases wherein the bag has a concave end 39*b*, on the width of the bag 39 not on its length since the sides of a wide bag are held in the feed rollers 36, 38 after the center portion of the bag has emerged from between the feed rollers 36, 38. Thus, no adjustment of the movement of transport belts 20 is required except to compensate for the aforementioned slight delay of a wide bag being freed from the feed rollers 36, 38 as opposed to a narrow bag. The means for providing this minor adjustment in the transport belt 20 travel will be described later. In the case of a bag 39 having a square or straight cut trailing end 39*b*, once the proper feed length is established, no further adjustment is needed for any length or width of bag 39. To prevent the transport belts 20 from reversing their direction as the connecting member is moved from left to right as view in FIG. 1, preparatory to moving the next succeeding bag 39, a one way or free wheeling clutch (not shown) is provided between the pinion 52 and its shaft 24. Such one way clutches are well known in the art, one common type being a Torrington Clutch Bearing.

As stated previously, the belts 20 must be moved in synchronism with the machine producing the bags to insure easy transfer of the bag from one machine to the other. To accomplish this a main shaft 68 is provided substantially beneath the pulleys 22. One end 70 of the main shaft 68 has a pulley 72 which is coupled to the main shaft (not shown) of the bag producing machine in a one to one ratio by any suitable means such as a chain, shaft or gear belts. The other end 74 of main shaft 68 has a crank arm 76 mounted thereon which, via a suitable mechanical linkage to connection member 66, gives the belts 20 their motion and insures that they will move at the same time relative speed as the bags emerging from the bag machine. Thus, just as do the bags 39, the belts 20 will start from rest at the beginning of the feed half of the machine cycle, accelerate for the first quarter of the cycle and deccelerate to a complete stop during the second quarter of the cycle. Thus the belts 20 will always travel slightly faster than the bags 39 as they are emerging from the bag producing machine.

The mechanical linkage for accomplishing this motion of the belts 20 comprises a pitman arm 78 attached at one end to crank 76 the other end of pitman arm 78 being slidably connected to a pivot arm 80. The pivot arm 80 is connected at one of its ends to a shaft 84 which in turn is mounted for pivotal movement in a bearing 86 secured to longitudinal frame member 88. The other end of pivot arm 80 is connected by linkage 90 to the connection member 66. As can be seen, as the crank 76 rotates, an oscillatory motion is realized at the end of the pivot arm 80 connected via linkage 90 to connecting member 66.

The magnitude of the oscillating motion of the pivot arm 80 and in turn the distance the belts 20 travel during each cycle is controlled by the position of the pitman arms connection to the pivot arm 80. Raising the connecting point shortens the pivot arm stroke while lowering it lengthens the pivot arm stroke. Thus the throw of the crank arm 76, length of pivot arm 80, gear ratios of pulleys 52, 56, 50 are chosen to give the desired bag travel.

Figure 6:
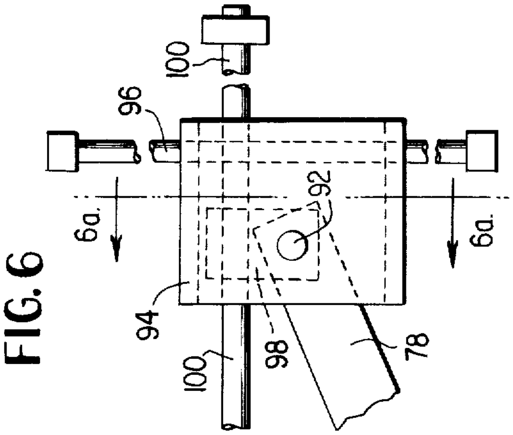
FIG. 6 is a side view of the connecting mechanism to the pitman arm.
Figure 6A:
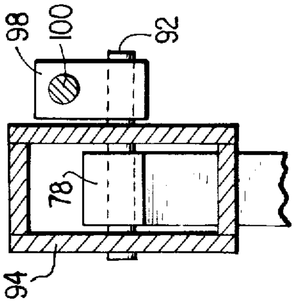
FIG. 6*a* is an end view of the connecting mechanism shown taken along the lines 6*a*.

Referring to FIG. 6, in order to vary the connection point of the pitman arm 78 on the pivot arm 80, the pitman arm 78 is secured by means of a pin 92, to a first sleeve 94 which slides on a rod 96 mounted on the pivot arm 80 parallel thereto. A second sleeve 98 is also secured to the pin 92 and has a horizontal slide shaft 100 pivotally attached at one end 102 to vertical frame member 104 close to main shaft 74. The slide shaft 100 is slidable relative to the sleeve 98 and is attached adjacent its other end 106 to a mechanical linkage which can raise or lower the end 106 at will. As stated previously, there are two modes in which the present machine can operate, namely, to attach the bags to tapes either wound on a roll or festooned in a carton or to stack them singly in a tray. To adjust the bag travel for taping bags having concave ends **39*b* of various widths requires a small raising or lowering of the end 106 of the slide shaft 100. This adjustment is accomplished by a handle 108 attached to threaded rod 110 which is held in a correspondingly threaded block 112 secured to the frame of the machine. The other end of the rod 110 is attached to one end of a rocker arm 114. The other end of rocker arm 114 is connected to the other end 106 of slide shaft 100 by means of a connecting link 116. The rocker arm 114 is mounted at its midpoint at the approximate center of an arm 118. Arm 118 is pivoted to vertical frame member 120 at one end and supported at the other end by a connecting link 122. The connecting link 122 is attached to an arm 124 keyed to the pivot shaft 126 supporting the taping platform 128. Thus, when the taping platform 128 is dropped out of the way (see phantom lines in FIG. 1), the end 106 of slide shaft 100 is also dropped causing a relatively large increase in the travel of belts 20 so that the bags 39 are completely ejected from the machine. The taping platform 128 is held in its operating position by latches 127 which can be rotated into and out of latching engagement with longitudinal frame member 30 by means of handle 129.**

In order to smooth out the operation of drive mechanism for the transport system 12, a V-pulley 130 is keyed to shaft 58 and has a cable 132 of a flexible material such as nylon wound partially around it. The cable 132 extends around idler pulley 134 mounted on frame member 120 and is secured to frame member 104 via a tension spring 136. As the shaft 58 is rotated at the start of a cycle by the oscillating pivot arm 80 and associated mechanism as hereinbefore described, the cable 132 is wound on the pulley 130 against the tension of spring 136 and as the pivot arm 80 is returned to its original position by rotational movement of crank 76, the cable unwinds while still maintaining tension.

To insure a complete stop of the belts 20 and prevent overrunning thereof during the deceleration quarter of the cycle, a brake is provided on the belt drive shaft 24. The brake consists of a V-pulley 138 keyed to the shaft 24 and a loop 140 of belting material, such as leather, positioned in a substantial portion of the pulley groove. As the loop 140 is pulled, friction between the loop and groove cause the shaft 24 to stop rotating. The mechanism for pulling the loop 140 as well as for timely acutating other mechanisms in the machine, will now be described in detail.

Figure 9:
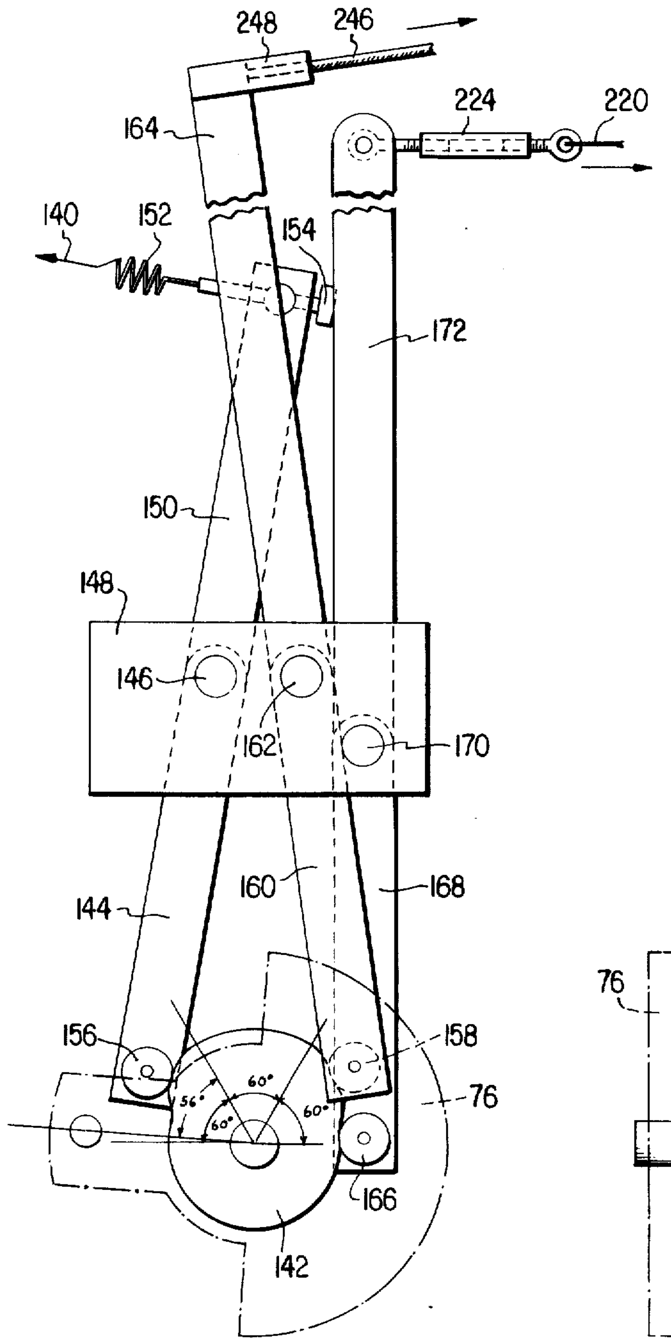
FIG. 9 is a side elevational view of the control arms for the taping rollers, presser roller and brake for the bag transport mechanism together with actuating cam therefore
Figure 10:
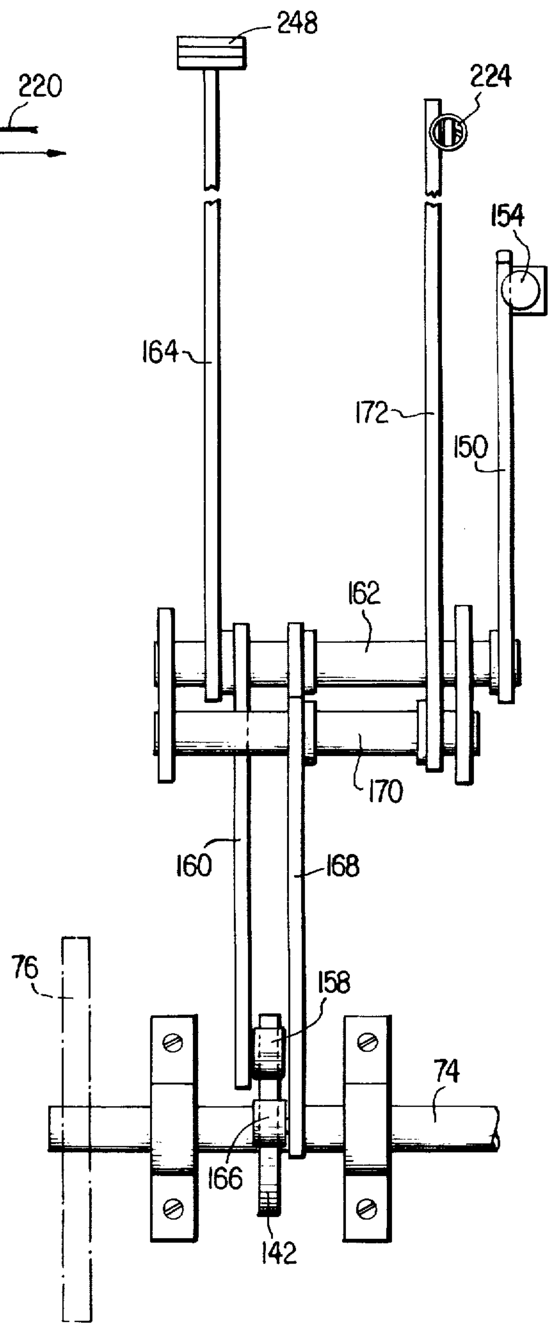
FIG. 10 is an end elevational view of the mechanism of FIG. 9.

Referring to FIGS. 9 and 10, the actuating mechanism consists of a cam 142 keyed to the main shaft 68. A first cam follower arm 144 is secured to a shaft 146 rotatably mounted between plates 148 secured to frame member 104. A brake actuating arm 150 is also secured at one end to the shaft 146 and the other end is connected to loop 140 via tension spring 152 and adjusting screw and knob 154. The loop 140 of belting material is then secured to its other end to eyelet 141. The cam follower 156 is positioned relative to the cam 142 so that the loop 140 is released during the acceleration part of the belt transport cycle and is drawn against the V-pulley groove during the deceleration part. A tension spring 143 connected between brake actuating arm 150 and eyelet 141 maintains cam follower 156 in constant engagement with cam 142. A second cam follower 158 and connecting arm 160 is provided secured to shaft 162. The shaft 162 is also rotatably mounted between plates 148. An acutating arm 164 is secured to shaft 162 for operating the presser roller in a manner to be more fully described later. A third cam follower 166 and connecting arm 168 is provided secured to a shaft 170. The shaft 170 is also rotatably mounted between plates 148. An acutating arm 172 is secured to shaft 170 for operating the taping rolls in a manner to be more fully described later.

The taping mechanism 14 as shown in FIGS. 11–15 consists of two rubber covered rolls 174 rotatably mounted on a shaft 176 which is pivotally secured to taping platform by means of a connecting link 178. The rolls 174 have a diameter larger than the last idler pulleys 32 of the transport system 12. The rolls 174 are biased by springs 180 against two metal rolls 182 of approximately two inches in diameter having knurled outer surfaces. The knurled rolls 182 are mounted on the taping platform 128 in line with and somewhat below rolls 174. The rolls 182 are driven by a shaft 184 having a gear belt pulley 186 located between the rolls 182. The knurled rolls 182 combined with spring biased rubber covered rolls 174 are the feed rolls for adhesive coated tapes 188. The adhesive coated tapes 188 are normally supplied on large spools 190 which are mounted on brackets 192 secured to the machine frame. The tapes 188 are fed over tape guides 189 adjacent shaft 126 to two semi-circular pulleys or tape guides 194 mounted on the taping platform 128 and from there under knurled rolls 182 and over rolls 174. The guides 194 are mounted on brackets 195 so they can be moved in the lateral direction to allow adjustment of the tape spacing within the confines of the width of the feed rolls 174, 182. The guides 194 are positioned so that the tapes 188 wrap at least 180° around the knurled rolls 182 with the adhesive side of the tapes contacting the knurled surface. This amount of wrap provides a very positive drive for these particular tapes yet minimizes the tendency for the tapes to stick to and wrap up on the knurled rolls 182. The tapes 188 are then wound, in one mode of operation, on a takeup mandrel 196 which will be more fully described later. As stated previously the feed rolls 174, 182 are mounted on the taping platform 128 which is pivoted on shaft 126. Latches 127 for platform 128 hold the taping rolls 174 approximately one-fourth inch below the line of travel of the bags 39 carried on the transport system 12. Releasing the latches 127 allows the feed rolls 174 to be lowered several inches thus permitting the bags 39 to be stacked in a pivoted tray 197 instead of affixed to the tapes 188. The tray 197 is supported by an extension of the main machine frame and is connected to the taping platform by arms 197*a*. The tray 197 raises out of the way when bags are being taped.

Each knurled roll 182 is mounted on shaft 184 by means of one way or free wheeling clutches of the aforementioned Torrington type which permits the rolls 182 to be rotated by hand in the forward direction only, each independently of the other. However, rotation of the shaft 184 in the forward direction causes the rolls 182 and their mating rubber covered rolls 174 to rotate together. This arrangement allows each line of tape 188 to be fed through its respective feed roll and advanced without affecting the other tape, thus allowing the tapes to be adjusted for equal tension at the start of the operation of the machine and for stripping any desired amount of tape out of the feed rolls after the package of bags is completed. The gear belt pulley 186 is driven by a gear belt 198 passing around a pulley 200 mounted on a tape drive shaft 202. The tape drive shaft 202 is mounted in suitable bearings on the underside of the taping platform 128 and a cutout in the platform permits the gear belt 198 to pass through. Another free wheeling or one way clutch 204, of the aforementioned Torrington type, is mounted on shaft 202 which prevents it from turning in the reverse direction, which in turn prevents the feed rolls 174, 182 from turning in the reverse direction under the strain exerted by tension applied to the tape spools 190 and the slight stretch of the base material of the tape.

Figure 11:
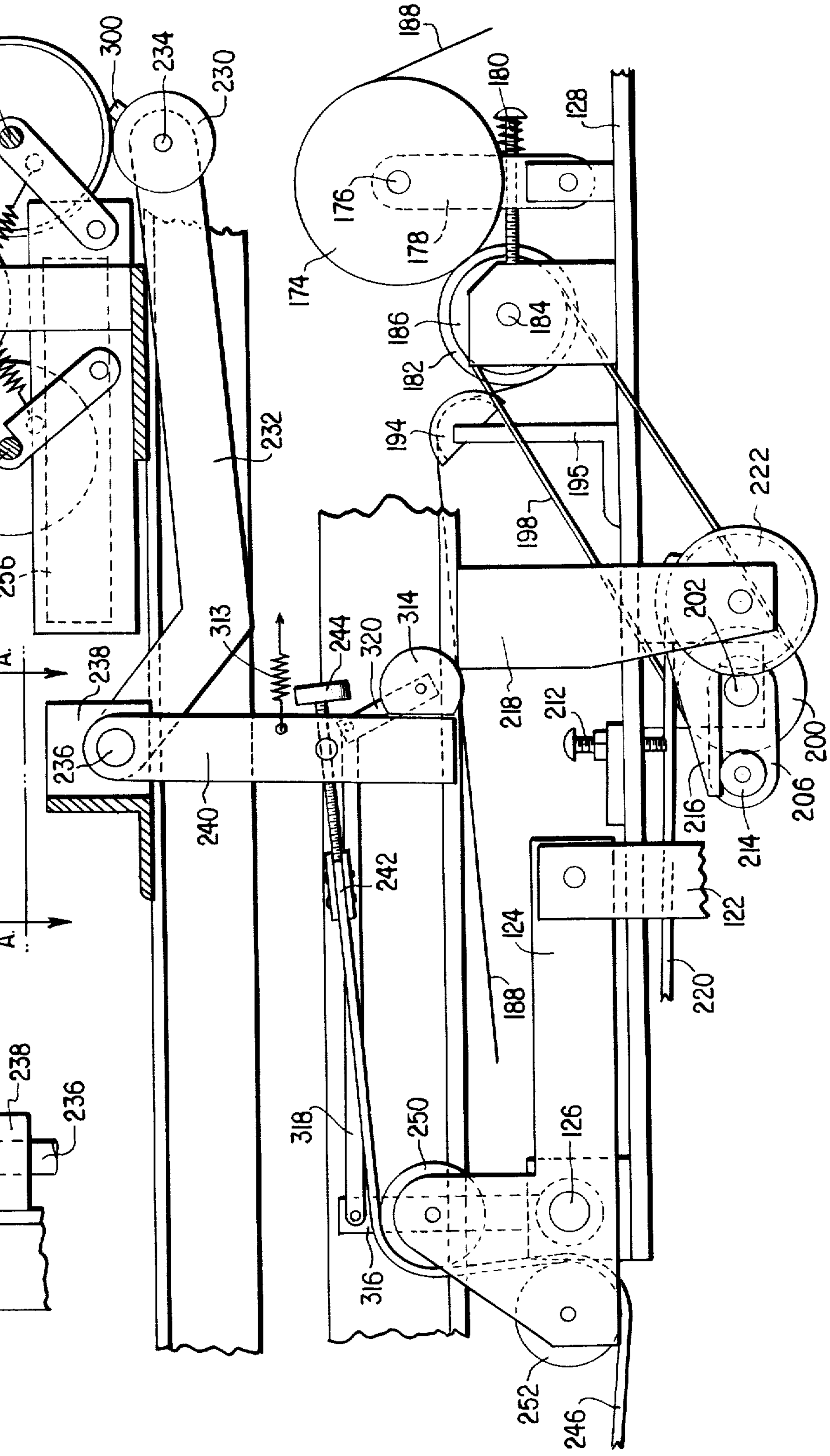
FIG. 11 is an enlarged side elevational view of the taping platform and gluing mechanism.

It is desirable to advance the tapes 188 approximately one inch for each cycle of the machine. This advance must be done during the "at rest" half of the machine cycle and after the presser rolls (to be later described) have pressed the bags to the tapes. It is also desired to actuate this tape advance only during the time that the taping rolls 174 are in the upper or operating position. To accomplish this, an actuator or rocker arm 206 is mounted on the end of the tape drive shaft 202. This arm 206 is also mounted on a free wheeling or one way Torrington type clutch bearing 208 so that it is free to move in the reverse direction but is positively locked to the shaft 202 when moved in the forward direction. A torsion spring 210 tends to always move this arm in the reverse direction, an adjustable stop 212 limits this movement. On the end of the rocker arm 206 is mounted a cam follower 214. Above and arranged to mate with cam follower 214 is another rocker arm 216 mounted in a bearing in a supporting member 218 fixed to the main machine frame. Thus, the cam follower 214 of the tape drive contacts this rocker arm 216 only when the taping platform 128 is in the operating position as shown in FIG. 11.

The rocker arm 216 is given an oscillating motion by a wire cable 220 which has one end thereof wound partially on a pulley 222 secured to a shaft axially aligned with the center of rotation of rocker arm 216. The wire cable 220 is, at its other end, attached to actuating arm 172 via turnbuckel 224. The actuating arm 172 in turn is moved by cam 142 and associated linkage as aforedescribed. A tension spring 226 keeps rocker arm 216 in the raised position as viewed in FIG. 9 and also holds cam follower 166 in contact with the main cam 142. FIG. 14 shows the rocker arm 216 in its actuated position whereby it engages cam follower 214 and rotates actuating arm 206 which in turn, via pulleys 186, 200 and belt 198, rotates the tape feed rolls 174, 182. FIG. 15 shows the rocker arm 216 and cam follower 214 out of operating engagement with each other when taping platform 128 is in its lowered position for stacking the bags 39 unattached to the tapes.

Another set of rollers 230, previously mentioned as the presser rollers, are of smaller diameter but have the same width as the taping rolls 174. The presser rollers 230 are rotatably mounted on an end of an arm 232 positioned above the line of bag travel. The outer surface of the pressure rollers 230 are also knurled to minimize the tendency of the tapes 188 to stick to and wrap around them in case a bag 39 is not present to be pressed onto the tapes. It should be noted again that the taping rolls 174 and presser rolls 230 are mounted between the bag transport belts 20 but as close to them as possible and still provide clearance therebetween.

Figure 13:
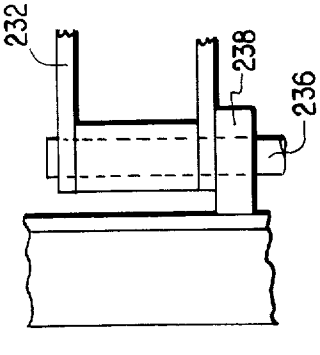
FIG. 13 is a plan view of a portion of the support arms for the presser roller taken along the lines A–A of FIG. 11.

The presser rolls 230 are mounted on a common shaft 234 and are free to turn independently. As can be seen in FIG. 13, the other end of the presser roll arm 232 is attached to a shaft 236 mounted in bearing 238 on a cross member of the main frame of the machine high enough above the line of travel of belts 20 to provide ample clearance for the bags 39 or about two inches. The shaft 236 extends to the drive side of the machine and has an actuating arm 240 secured to the end thereof and extending downwardly. On actuating arm 240 is a clamp 242 with a screw adjustment 244. In clamp 242 is secured a piece of gear belt 246, the other end of which belt is held in a similar clamp 248 on the end of actuating arm 164. Thus, rotation of cam 142 causes the presser rolls 230 to move up and down. In order to prevent the presser rolls 230 from interfering with bag travel when bags 39 are not being taped, the gear belt 246 passes in an S-shaped path through two idler pulleys 250, 252, mounted on the taping platform pivot shaft 126. When the taping platform 128 is in the up position, the gear belt 246 is tightened so as to produce motion of the presser rolls 230. However, when the taping platform 128 is dropped, the gear belt 246 goes slack resulting in no motion of the presser rolls 230. A spring 254 holds the presser rolls 230 up except when forced down by the cam 142 working through gear belt 246 and its attendant linkage. Gear-type belting was chosen because of its high tensile strength, low elongation, extreme flexability and ease with which the ends thereof can be held securely in clamps 242, 248. Thus, when the concave or trailing end of an open ended bag 39 is moved by the transport belts 20 to a position directly above the taping rolls 174, the presser rolls 230 are caused to descend by cam 142 to press the bag 39 onto the tapes 188. The taping rolls 174 are then advanced by cam 142 and the taping position is thus cleared for another open ended bag 39. If however, the bags 39 are of the closed ended type as disclosed in my aforementioned pending patent application Ser. No. 512,854, a gluing system is also provided as will now be described.

Figure 12:
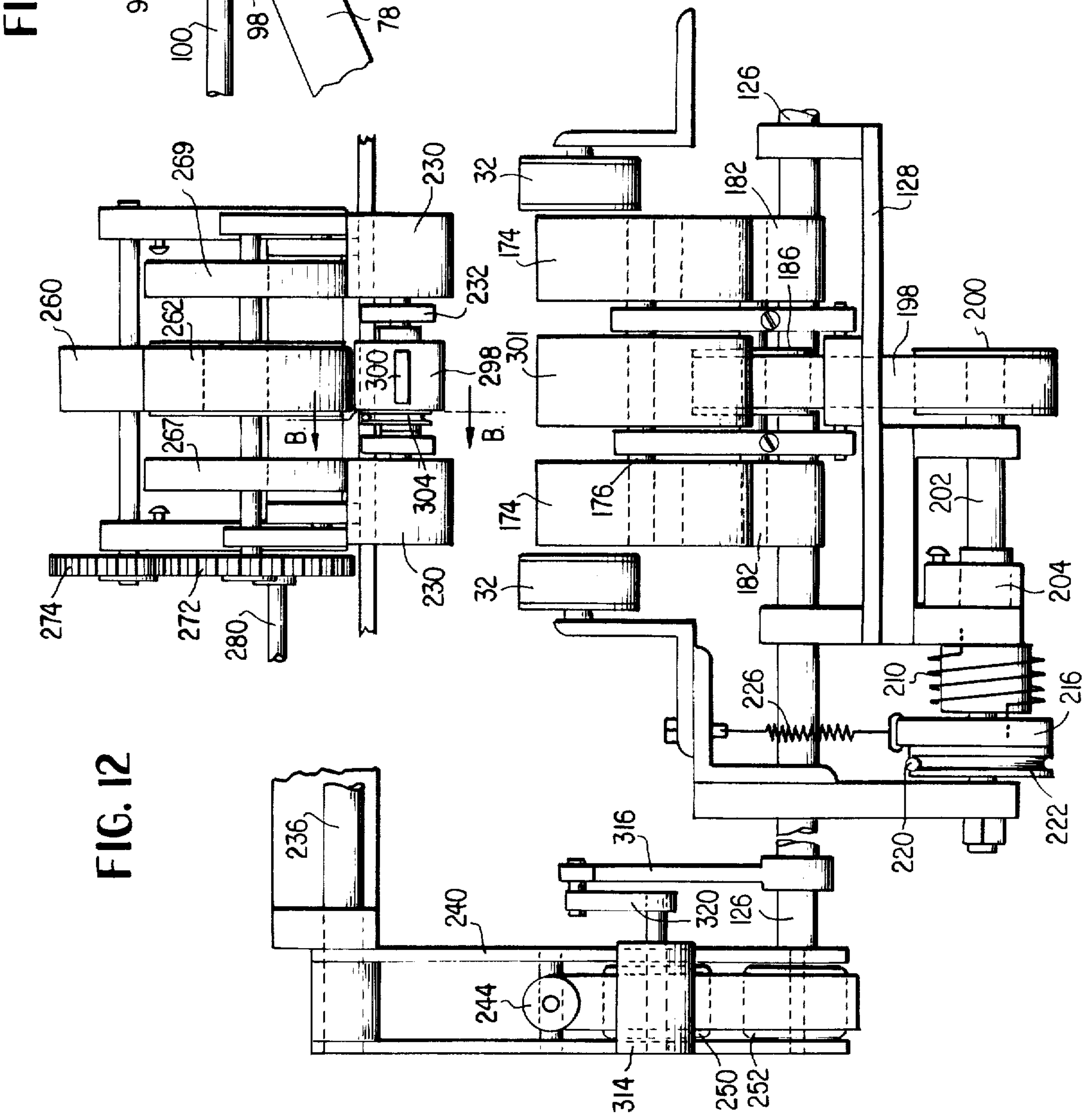
FIG. 12 is an enlarged end elevational view of the taping platform and gluing mechanism of FIG. 11.

Referring to FIGS. 1, 11 and 12, directly above the presser rolls 230 is mounted the gluing mechanism 16. The gluing mechanism consists of a glue receptical 256, a metal fountain roll 258, a metal analox roll 260 and a rubber covered transfer roll 262. The fountain roll 258 and analox roll 260 are of the same diameter and width while the transfer roll is of a larger diameter. The axis of rotation of the analox roll 260 is approximately 30° above the axis of rotation of the fountain roll 258 and the axis of rotation of the transfer roll 262 is approximately 30° below the axis of rotation of the analox roll 260. Thus, the surface of the transfer roll 262 at its lowest point is below the glue fountain 256. The transfer roll 262 is mounted on a shaft 264 on which is also mounted on either side thereof two other rubber covered rolls 267, 269 of the same approximate diameter as the transfer roll 262 and spaced so as to contact the presser rolls 230 when the presser rolls are in the upper position.

The analox roll 260 is mounted on shaft 266 in fixed bearings while the fountain roll 258 and transfer roll 262 are mounted on shafts 268, 264, respectively and spring biased against the analox roll 260 by means of tension springs 270 to maintain good uniform contact therebetween. All three rolls 258, 260, 262 are connected together by gears 272, 274, 276 secured to the ends of shafts 264, 266 and 268 respectively, the pitch diameters of the gears are the same as outside diameters of their corresponding rolls. A small pinion gear 278 drives the gears 272–276 and is connected by means of a shaft 280 to a right angle drive 283 which, in turn, is connected by rod 284 to another right angle drive 286. Right angle drive 286 is then connected to a jack shaft 288 having a pulley 290 connected to the other end thereof. A pulley 292 identical to pulley 290 is connected to the end of main drive shaft 70. The pulleys 290, 292 are connected by gear belt 294 in a 1 to 1 ratio. The analox roll shaft 260 is held in split bearings whose tops are removed by removing screws 296. Removing the analox roll 260 releases the fountain roll 258 which simply lies in two open side bearings permitting the glue fountain 256 to be lifted out. Cleaning of the various rolls can be easily accomplished with a solvent.

The axis of rotation of the transfer roll shaft 264 is directly above and parallel to the presser roll shaft 234 and the mounting height of the transfer roll 262 is such that the presser rolls 230 can contact the other rubber covered rolls 267 mounted on either side of the transfer roll 262. Mounted on the presser roll shaft 234 and midway between the presser rolls 230 is a small print roll 298. On the print roll 298 is secured a rubber type 300 of the desired dimensions for printing a spot glue in the center and adjacent the top edge of each bag 39. The rubber type 300 is made to pick up glue by contacting the glue transfer roll when it is rotated to its upper position by engagement of rotating rubber covered roll 267 and presser rolls 230 as shown in FIGS. 11 and 12. The glue spot is then printed on the bag 39 when the type 300 is moved to its lower position by transfer roll 174 engaging rotating presser rolls 230. An additional roll 301 is also rotatably mounted on shaft 176 between taping rolls 174 and directly below print roll 298 to act as a support for the bag 39 as the rubber type 300 is printing the glue spot on the bag 39. Because of the movement of each bag 39 after being pressed on the tapes 188 is only approximately 1 inch, the rotational arc of the print type 300 must be precisely controlled. The circumference of the print rolls 230 are greater than this 1 inch. This control is accomplished by always starting the print roll 298 from the same neutral position whether it is contacting the bag 39 or the transfer roll 262. This neutral position is chosen so that a circumferential movement of one inch of the right hand presser roll 174 as viewed in FIG. 11 causes the print roll 298 to rotate enough to print the glue spot 302 on the bag 39. The print roll 298 and right hand presser roll 174 are keyed on their respective shafts. The left hand presser roll 174 as viewed in FIG. 12 is free to rotate independently.

In order to start the print roll 298 from this same neutral position, the print roll 298 is provided with a groove 304 cut in its cylindrical shaped outer surface. A strong but extremely flexible cord 306 such as nylon, passes through a hole 308 in the groove 304 and is fixed in place by, for example, a knot. Thus the print roll 298 can turn in either direction (as shown in phantom lines in FIG. 16) from a point where the cord 306 passes through the groove 304. A set of steel guides 310 holds the cord 306 close to the groove 304. A tension spring 312 connected to the other end of cord 306 always brings the print roll 298 back to the same position when left free to rotate yet it can be rotated in an arc in either direction with a small force. This rotational force, as aforementioned, is provided by the right hand presser roll 230 when it is held against the taping roll in the down position, and by the rubber roll 269 on the glue transfer roll shaft 264 when in the upper position. As the presser rolls 230 move from one position to the other the spring 312 returns the print roll 230 rapidly to its neutral position.

When the taping platform 128 is lowered, the presser rolls 230 are returned to an inactive position by spring 313. If left in the extreme upper position, the constant rotation of the glue transfer roll 262 would cause undesirable continuous rotation of the print roll 298. This may cause damage to the neutral return mechanism. To prevent this damage from occurring, the actuating arm 240 for the presser rolls 230 contacts a cam 314 at its lower end. The cam 314 is connected to another arm 316 fixed to the taping platform pivot shaft 126 by linkage elements 318, 320. Thus, as the taping platform 128 is lowered, the cam 314 rotates arm 240 to lower the presser rolls 230 about one-fourth inch below the transfer roll 262 and out of contact therewith when the bags 39 are not being taped. As aforementioned, an extension of the main machine frame supports a pivoted tray 197 linked by arms 197*a* to the taping platform 128. The tray 197 drops below the line of travel of the bags 39 in the lower position but raises out of the way when bags are being taped.

Lower down on the frame extension is mounted the wind-up mandrel 196 having suitable core plugs 326 for mounting cylindrical shaped, cardboard cores 328. A gear 330 on the end of the mandrel 196 meshes with a driving gear 332. Referring to FIG. 17, bearings 334 in which the mandrel 196 is supported are located in brackets 335, and are open topped so that the mandrel 196 can be dropped quickly into the bearings. A latch 336 on both brackets 335 hold the mandrel 196 securely in place but can be moved to release the mandrel by simply rotating them away with a finger as the mandrel is lifted out. On returning the mandrel 196, it is placed on the brackets 335 and drawn toward the operator. This moves the latches 336 temporarily out of the way and they automatically drop back into the locking position as the mandrel drops into its bearings.

The rotation of this wind-up mandrel 196 is friction driven to provide proper take-up of the taped bags but not so strong as to pull the tapes 188 through the taping feed rolls 174, 182. Friction brakes, to be described shortly, on the tape spools are adjusted to prevent this. The mandrel drive is by means of a cord 338 given a 180° wrap around a smooth, deep grooved drive pulley 340 keyed on shaft 84 of pivot arm 80. The drive pulley 340 rotates in an arc as the pivot arm 80 oscillates to drive the transport system 12. The cord 338 then extends substantially around another deep grooved pulley 342 on shaft 343 which is keyed to gear 332 to rotate mandrel 196. An idler pulley 344 is biased against the cord 338 by a spring 346 for keeping the proper tension in the cord 338. A free wheeling or one direction clutch bearing of the Torrington-type is located between pulley 342 and its shaft 343 for preventing the mandrel drive from turning in reverse.

The two spools of tape 190 are mounted on spindles 348 beneath the bag transport system 12. Each spindle 348 is provided with a friction brake consisting of a pulley 350 and spring tensioned cords 352.

OPERATION OF THE MACHINE

Figure 8:
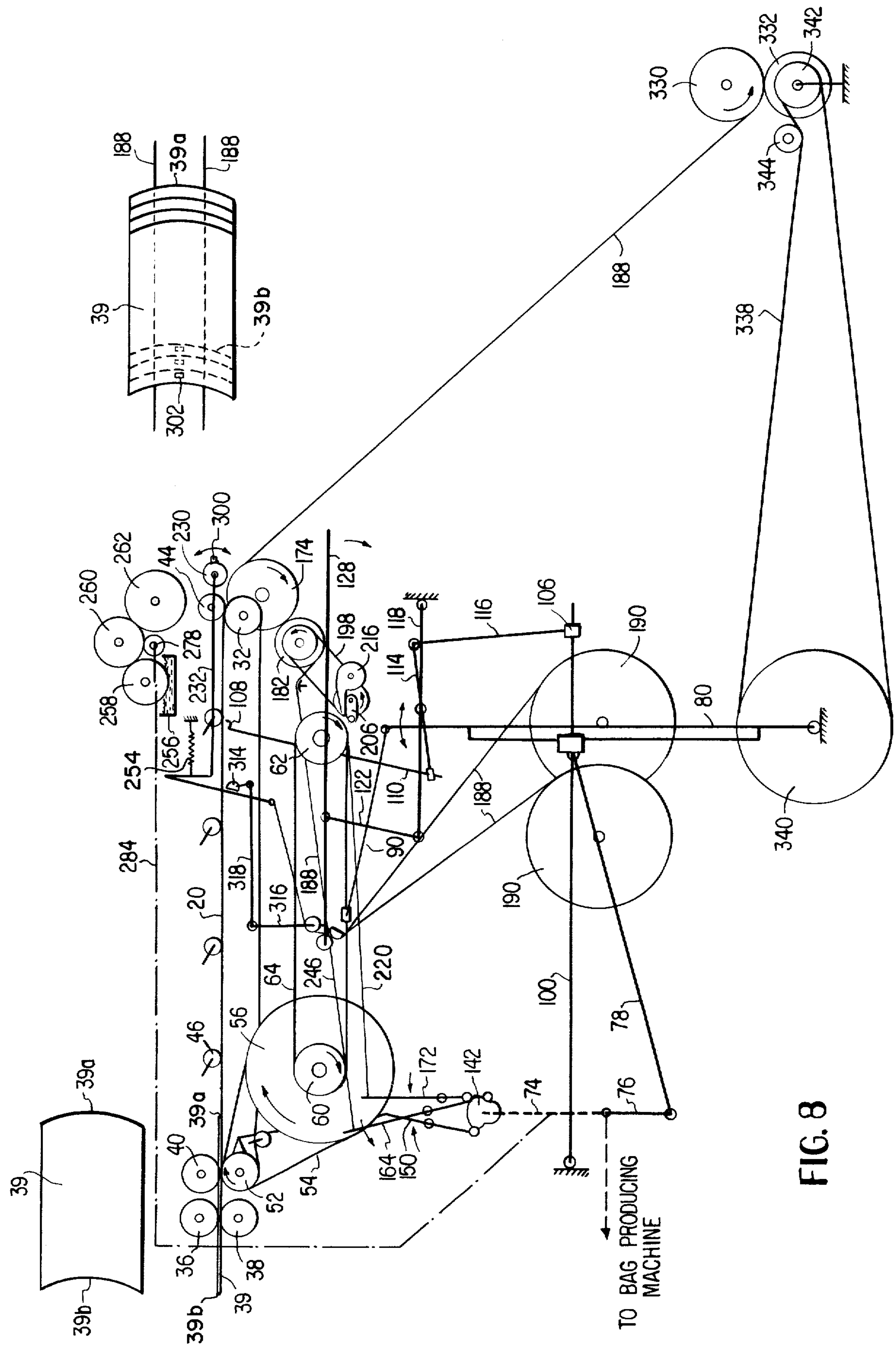
FIG. 8 is a schematic representation of the apparatus of the present invention.

Referring to the drawings and in particular to the schematic representation of the machine of the present invention shown in FIG. 8, a bag 39 is produced by a machine, the output feed rollers of which are shown at 36, 38. The bag 39, for example, has a convex-shaped closed, leading end 39*a* and a concave-shaped trailing end 39*b* which may be either open or closed, however, it may have squared-off leading and trailing ends as aforementioned. The principle of operation of the present machine is to receive each bag 39 as it emerges from between feed rollers 36, 38 of the bag producing machine (not shown) and transport it to a fixed point where it is pressed onto the two lines of adhesive coated tape 188. The tapes 188 are then advanced approximately 1 inch and if desired, a spot of adhesive 302 is applied in the center of the bag approximately one-half inch from the top. This spot of glue 302 then contacts the following overlaying bag.

The bag 39 emerges from between feed rollers 36, 38 and enters the present machine between rollers 22, 40 to a position on top of belts 20 and beneath idler rollers 46. As long as any part of any bag 39 is held in the last feed rolls 36, 38 of the bag producing machine it cannot be moved faster by belts 20 than the speed at which it is emerging from between rollers 36, 38. As soon as the bag 39 is released by the bag machine feed rollers 36, 38, it moves rapidly with belt 20. The main drive shaft 76 of the present machine is connected in a one to one ratio with the bag transport system of the bag producing machine thus the belts 20 move only when the bag 39 is moved between rollers 36, 38 by the aforementioned transport system. Further, because the distance between the feed rolls 36, 38 and the taping position of the present machine remains fixed, each bag will be transported the same distance regardless of its length. Movement of the belts 20 is accomplished by rotation of crank 76 which in turn rotates drive pulley 52 via inteconnected drive elements 78, 80, 90, 64, 56, and 54. If contoured bottom bags such as those disclosed having a concave trailing edge 39*b* are being produced, such trailing edge 39*b* will finally emerge from the feed rolls 36, 38 at a time dependent on the width of the bag 39. The wider the bag 39, the longer before it finally clears the feed rolls 36, 38. To adjust the length of travel of belts 20 for each oscillatory movement of pivot arm 80 to thus compensate for the aforementioned variations in bag width, a shaft 100 is provided which is slidable relative to the connecting point of the pitman arms 78 to the pivot arm 80. Rotation of handle 108 will via linkage elements 110, 114, 116 raise or lower the end 106 of shaft 100 which in turn will vary the connection point and the length of travel of connection member 66.

When the concave trailing edge 39*b* arrives at the taping position it is held there between rollers 32, 44. Continued rotation of crank 76 will return pivot arm 80 and move actuating arm 164 to thereby cause presser rollers 230 to descend. Presser rollers 230 press the bag 39 onto the adhesive coated tapes 188 passing under knurled rolls 182 and over rubber covered rolls 174. As the crank 76 continues its rotation, actuating arm 172 is caused to move thus rotating rocker arm 216 which in turn will rotate rubber covered rolls 174 via interconnected drive elements 206, 200, 198, 186 and 182. Rotation of rolls 174 will pull the taped bag 39 from between rollers 32, 44 to clear the taping position for the arrival of the next bag.

If it is desired to secure the bags together at a point adjacent concave end 39b by a spot of glue 302, rotation of main shaft 74 will cause rotation of glue pot rolls 258, 260, 262 via interconnected drive elements 284, 278 and 272–276 to bring glue from pot 256 and transfer it onto roller 262. As transfer roller 262 moves, rubber covered roll 269 will, through its engagement with presser roller 230, rotate print roll 298 to bring rubber type 300 into engagement with the glue on roll 262. After presser rolls 230 descend into engagement with the bag 39, rotation of taping rolls 174 will cause the print roll 298 to rotate thus bringing type 300 adjacent the bag and transfering the glue thereon onto the bag. The drive pulley 340 will rotate as pivot arm 80 is returned to in turn rotate mandrel 196 to windup the chain of imbricated bags 39.

If it is desired to stack the bags 39 unattached to tapes 188, taping platform 128 is dropped to its inoperative position which in turn will lower tray 197 to a position for receiving the bags as they emerge from the machine. Lowering of taping platform 128 will move cam followers 214 a sufficient distance from rocker arm 216 to prevent contact thereby as well as rotate idler pulleys 250, 252 to prevent gear belt 246 from raising and lowering presser rolls 230. Cam 314 and its associated linkage to taping platform pivot shaft 126 will lower presser rolls 230 and prevent glue from being transfered to type 300. In the event the machine is operated to only secure the bags to the tapes without the spot of glue being placed thereon, the gluing mechanism 16 is simply removed.

It is to be understood that the present invention is not confined to the particular construction herein illustrated and described but embodies all such modifications thereof as may come within the scope of the following claims.

What is claimed is:

1. An apparatus for securing bags to an adhesive coated tape to form an imbricated, continuous chain of said bags, said bags being intermittently fed to said apparatus from a bag source on an individual basis where the forward end of each bag, immediately prior to its being fed from said bag source, extends out of said source while the trailing end thereof is momentarily held in place by said source until the bag is fed therefrom, said apparatus comprising:

a. a frame, b. an endless conveyor carried by said frame, c. drive means responsive to said bag source for driving said conveyor means so that each bag released by the source is conveyed a first predetermined distance until the said trailing end thereof is disposed at a bag taping position at which time the conveyor means is momentarily stopped while the following bag is momentarily held at its trailing end in the bag source with its forward end extending onto said conveyor whereby said bags are conveyed to said bag taping position regardless of the length thereof since the bags are conveyed with respect to the said trailing ends thereof, and d. a taping means mounted on said frame at said taping position in the path of movement of said bag, said taping means having at least one taping roll located beneath said taping position around which is fed an adhesive coated tape, said taping means further having at least one presser roll located above said taping position directly opposite said taping roll, said taping roll and said presser roll being operatively connected to said drive means for sequentially pressing said bags onto said tape with said presser rolls and incrementally rotating said taping roll to sequentially remove said bags a second predetermined distance from said conveyor after they have been pressed onto said tape when said endless conveyor is stopped so that said bags are sequentially pressed onto said tape to form said imbricated, continuous chain of bags regardless of the length of said bags since said trailing ends of said bags are conveyed to the bag taping position.

2. The apparatus as set forth in claim 1 wherein said conveyor comprises at least one endless belt mounted for rotation between first and second, spaced apart, frame mounted pulleys, said first pulley being located adjacent said one taping roll, said second pulley being a drive pulley for said belt and means positioned above and below said belt for insuring slipless horizontal movement of said bags on said belt from said source to said taping position.

3. The apparatus as set forth in claim 2 wherein said drive means comprises:

a. an additional, chain type endless belt having teeth disposed along the length thereof mounted for rotation between two spaced apart pulleys secured to said frame, one of said pulleys being operatively connected to said drive pulley of said conveyor belt, b. a drive member mounted on said frame beneath said additional belt, said drive member being connected directly to said additional belt and in engagement with at least some of said teeth, c. rotatable shaft means journalled on said frame, one end of said shaft being connected to a means for providing said source of said bags, the other end of said shaft having a bell-crank secured thereto, and d. linkage means connected between said bell-crank and said drive member whereby said drive member moves said additional belt in response to rotation of said bell crank.

4. The apparatus as set forth in claim 3 wherein said linkage comprises:

a. a pivot arm pivotally mounted at one end to said frame, the other end of said pivot arm being connected to said drive member, b. a pitman-type arm having one end thereof rotatably connected to said bell-crank and the other end thereof connected to said pivot arm for sliding movement relative thereto, and c. an adjusting arm having one end thereof pivotally connected to said frame, a middle portion thereof slidably connected to the other end of said pitman-type arm, and the other end of said adjusting arm being connected to said taping platform and to an ajustable linkage, whereby said adjusting arm can be maintainable in a plurality of positions to thereby control the extent of movement of the other end of said pivot arm and thus the extent of said first predetermined distance whenever said taping platform or said adjustable linkage is moved.

5. The apparatus as set forth in claim 3 wherein said taping means comprises two taping rollers rotatably mounted on a platform which is pivotally mounted on said frame, said taping platform being operatively connected to said linkage whereby upon movement of said taping platform from a first to a second position, said drive means in response to said last-mentioned movement drives said conveyor in its transporting direction a distance greater than said first predetermined distance so that the bags are fed completely past said taping position and from said conveyor.

6. The apparatus as set forth in claim 3 wherein said rotatable shaft means has cam means secured thereto for timing said transporting and dwell periods of movement of the conveyor and first, second and third cam follower arms pivotally mounted on said frame engagable with said cam means.

7. The apparatus as set forth in claim 6 wherein said taping means further comprises two presser rollers rotatably mounted on a support arm which is pivotally mounted on said frame and said first cam follower arm is operatively connected to said presser rollers to move said presser rollers into and out of engagement with said taping rollers to thereby press said bag into engagement with said adhesive coated strip.

8. The apparatus as set forth in claim 7 wherein said taping means further comprises:

a. a presser roller actuating arm connected to said support arm, b. belt means connected between said first cam follower arm and said presser roller actuating arm, and c. means operatively connected to said platform for tightening said belt when said platform is in said first position to insure proper movement of said presser rollers and for loosening said belt when said platform is in said second position to prevent movement of said presser rollers.

9. The apparatus as set forth in claim 7 wherein said taping means further comprises a further roller located intermediate of said presser rollers and operatively connected to one of said presser rollers for rotation therewith, said further roller having means thereon for transferring glue from a source to said bag adjacent an end of the bag which is to be overlapped by the following bag when said bag is being moved from said fixed taping position by said taping rollers.

10. The apparatus as set forth in claim 6 wherein said drive pulley has brake means associated therewith and said third cam follower arm being operatively connected to said brake means for actuating said brake to stop movement of said endless belt when one end of said bag is at said taping position.

11. The apparatus as set forth in claim 6 wherein said second cam follower arm is operatively connected to said taping roller for incrementally advancing said taping roller to thereby remove said bag said second predetermined distance from said taping position after it has been pressed onto said tape.

12. The apparatus as set forth in claim 11 wherein said taping means further comprises two drive rollers rotatably mounted on said platform, one of said drive rollers being in frictional engagement with one of said taping rollers, said drive rollers being axially aligned and interconnected by clutch means for permitting both of said taping rollers to be rotated together in one direction and either of said taping rollers to be rotated in the same direction independent of each other.

13. The apparatus as set forth in claim 12 wherein said taping means further comprises a drive roller actuating arm connected to said drive rollers, said drive roller actuating arm having a cam follower mounted thereon and a rocker arm rotatably mounted on said frame for engagement with said cam follower to thereby actuate said drive rollers only when said platform is in its first position, said rocker arm being connected to said second cam follower arm by linkage means whereby said taping roll is not incrementally rotated when said platform is in its second position.

14. An apparatus for securing bags to an adhesive coated tape to form an imbricated, continuous chain of said bags, said apparatus comprising:

a. a frame, b. an endless conveyor carried by said frame, c. means operatively connected to said conveyor for driving said conveyor to periodically and sequentially transport a single bag from a source of said bags to a fixed position for taping said bags located at the end of said conveyor in the direction of movement of said bags, and d. a taping means mounted on said frame at said taping position in the path of movement of said bag, said taping means having at least one taping roll located beneath said taping position around which is fed an adhesive coated tape, said taping means further having at least one presser roll located above said taping position directly opposite said taping roll, said taping roll and said presser roll being operatively connected to said drive means for sequentially pressing said bag onto said tape with said presser rolls and rotating said taping roll to remove said bag from said taping position during the dwell period of movement of said endless conveyor, said conveyor comprising at least one endless belt mounted for rotation between first and second, spaced apart, frame mounted pulleys, said first pulley being located adjacent said one taping roll, said second pulley being a drive pulley for said belt and means positioned above and below said belt for insuring slipless horizontal movement of said bags on said belt from said source to said taping position, said drive means comprising:

a. an additional, chain type endless belt having teeth disposed along the length thereof mounted for rotation between two spaced apart pulleys secured to said frame, one of said pulleys being operatively connected to said drive pulley of said conveyor belt, b. a drive member mounted on said frame beneath said additional belt, said drive member being connected directly to said additional belt and in engagement with at least some of said teeth, c. rotatable shaft means journalled on said frame, one end of said shaft being connected to a means for providing said source of said bags, the other end of said shaft having a bell-crank secured thereto, and d. linkage means connected between said bell-crank and said drive member whereby said drive member moves said additional belt in response to rotation of said bell-crank, said rotatable shaft means having cam means secured thereto for timing said transporting and dwell periods of movement of the conveyor and first, second and third cam follower arms pivotally mounted on said frame engagable with said cam means, said taping means further comprising two presser rollers rotatably mounted on a support arm which is pivotally mounted on said frame and said first cam follower arm is operatively connected to said presser rollers to move said presser rollers into and out of engagement with said taping rollers to thereby press said bag into engagement with said adhesive coated strip, and said taping means further comprising a further roller located intermediate of said presser rollers and operatively connected to one of said presser rollers for rotation therewith, said further roller having means thereon for transferring glue from a source to said bag adjacent an end of the bag which is to be overlapped by the following bag when said bag is being moved from said fixed taping position by said taping rollers.

15. The apparatus as set forth in claim 14 wherein said source of said glue comprises:

a. a glue receptacle mounted on said frame, b. a fountain roller rotatably mounted on said receptacle, for withdrawing glue from said receptacle, c. a transfer roller rotatably mounted on said receptacle, d. an analox roller rotatably mounted on said receptacle intermediate said fountain roller and said transfer roller whereby upon rotation of said rollers said glue is withdrawn from said receptacle by said fountain roller and deposited on said transfer roller via said analox roller.

16. The apparatus as set forth in claim 15 wherein said transfer roller has a pair of side rollers axially aligned and mounted for rotation with said transfer roller, one of said side rollers being periodically engagable with one of said presser rollers to rotate said presser roller and bring said glue transfer means on said further roller into engagement with said transfer roller to pick up glue therefrom.

17. The apparatus as set forth in claim 16 wherein said fountain transfer, and analox rollers are rotated by drive means operatively connected to said rotatable shaft means.

18. The apparatus as set forth in claim 16 wherein said further roller has spring means operatively connected thereto for returning said transfer means to neutral position after said transfer means has picked up glue and before said transfer means transfers said glue to said bag.

19. Apparatus for securing bags to an adhesive coated tape to form an imbricated, continuous chain of said bags, said bags being intermittently fed to said apparatus from a bag source on an individual basis where the forward end of each bag, immediately prior to its being fed from said bag source, extends out of said source while the trailing end thereof is momentarily held in place by said source until the bag is fed therefrom, said apparatus comprising:

a. a frame, b. conveyor means carried by said frame, said forward end of each bag extending onto said conveyor means while the bag is being momentarily held in place, c. drive means responsive to said bag source for driving said conveyor means so that each bag released by the source is conveyed a predetermined distance until the said trailing end thereof is disposed at a bag taping position at which time the conveyor means is momentarily stopped while the following bag is momentarily held at its trailing end in the bag source with its forward end extending onto said conveyor whereby said bags are conveyed to said bag taping position regardless of the length thereof since the bags are conveyed with respect to the said trailing ends thereof, d. means responsive to said bag source disposed at said bag taping position for sequentially pressing said bags onto an adhesive coated tape and incrementally moving said tape to sequentially remove said bags a predetermined distance from said conveyor after they have been pressed onto said tape when said conveyor means is stopped so that said bags are sequentially pressed onto said tape to form said imbricated, continuous chain of bags regardless of the length of said bags since said trailing ends of said bags are conveyed to the bag taping position.

20. Apparatus as in claim 19 including control means for regulating said predetermined distance that each bag is conveyed to the taping position whereby said predetermined distance can be adjusted to accommodate bags having a curved trailing end where bags with curved trailing ends are released at different times by said bag source depending on the curvature of the trailing end thereof.

21. Apparatus as in claim 19 including means for placing a spot of glue on each said bag adjacent said trailing edge thereof in response to the movement of each bag from said bag taping position.

22. An apparatus for securing bags to an adhesive coated tape to form an imbricated, continuous chain of said bags, said apparatus comprising:

a. a frame b. an endless conveyor carried by said frame, c. means operatively connected to said conveyor for driving said conveyor to periodically and sequentially transport a single bag from a source of said bags a predetermined distance to a fixed position for taping said bags located at the end of said conveyor in the direction of movement of said bags, d. a taping means mounted on said frame at said taping position in the path of movement of said bag, said taping means having at least one taping roll located beneath said taping position around which is fed an adhesive coated tape, said taping means further having at least one presser roll located above said taping position directly opposite said taping roll, said taping roll and said presser roll being operatively connected to said drive means for sequentially pressing said bag onto said tape with said presser rolls and rotating said taping roll to remove said bag from said taping position during the dwell period of movement of said endless conveyor, said conveyor comprising at least one endless belt mounted for rotation between first and second, spaced apart, frame mounted pulleys, said first pulley being located adjacent said one taping roll, said second pulley being a drive pulley for said belt and means positioned above and below said belt for insuring slipless horizontal movement of said bags on said belt from said source to said taping position, said drive means comprising:

a. an additional, chain type endless belt having teeth disposed along the length thereof mounted for rotation between two spaced apart pulleys secured to said frame, one of said pulleys being operatively connected to said drive pulley of said conveyor belt, b. a drive member mounted on said frame beneath said additional belt, said drive member being connected directly to said additional belt and in engagement with at least some of said teeth, c. rotatable shaft means journalled on said frame, one end of said shaft being connected to a means for providing said source of said bags, the other end of said shaft having a bell-crank secured thereto, and d. linkage means connected between said bell-crank and said drive member whereby said drive member moves said additional belt in response to rotation of said bell crank, and said linkage comprising:

a. a pivot arm pivotally mounted at one end to said frame, the other end of said pivot arm being connected to said drive member, b. a pitman-type arm having one end thereof rotatably connected to said bell-crank and the other end thereof connected to said pivot arm for sliding movement relative thereto, and c. an adjusting arm having one end thereof pivotally connected to said frame, a middle portion thereof slidably connected to the other end of said pitman-type arm, and the other end of said adjusting arm being connected to said taping platform and to an adjustable linkage, whereby said adjusting arm can be maintainable in a plurality of positions to thereby control the extent of movement of the other end of said pivot arm and thus the extent of said predetermined distance whenever said taping platform or said adjustable linkage is moved.

23. An apparatus for securing bags to an adhesive coated tape to form an imbricated, continuous chain of said bags, said apparatus comprising:

a. a frame, b. an endless conveyor carried by said frame, c. means operatively connected to said conveyor for driving said conveyor to periodically and sequentially transport a single bag from a source of said bags to a fixed position for taping said bags located at the end of said conveyor in the direction of movement of said bags, and d. a taping means mounted on said frame at said taping position in the path of movement of said bag, said taping means having at least one taping roll located beneath said taping position around which is fed an adhesive coated tape, said taping means further having at least one presser roll located above said taping position directly opposite said taping roll, said taping roll and said presser roll being operatively connected to said drive means for sequentially pressing said bag onto said tape with said presser rolls and rotating said taping roll to remove said bag from said taping position during the dwell period of movement of said endless conveyor, said conveyor comprising at least one endless belt mounted for rotation between first and second, spaced apart, frame mounted pulleys, said first pulley being located adjacent said one taping roll, said second pulley being a drive pulley for said belt and means positioned above and below said belt for insuring slipless horizontal movement of said bags on said belt from said source to said taping position, said drive means comprising:

a. an additional, chain type endless belt having teeth disposed along the length thereof mounted for rotation between two spaced apart pulleys secured to said frame, one of said pulleys being operatively connected to said drive pulley of said conveyor belt, b. a drive member mounted on said frame beneath said additional belt, said drive member being connected directly to said additional belt and in engagement with at least some of said teeth, c. rotatable shaft means journalled on said frame, one end of said shaft being connected to a means for providing said source of said bags, the other end of said shaft having a bell-crank secured thereto, and d. linkage means connected between said bell-crank and said drive member whereby said drive member moves said additional belt in response to rotation of said bell-crank, said rotatable shaft means having cam means secured thereto for timing said transporting and dwell periods of movement of the conveyor and first, second and third cam follower arms pivotally mounted on said frame engagable with said cam means, and said drive pulley having brake means associated therewith and said third cam follower arm being operatively connected to said brake means for actuating said brake to stop movement of said endless belt when one end of said bag is at said fixed taping position.

* * * * *